United States Patent [19]

Sandstrom et al.

[11] Patent Number: 5,216,066
[45] Date of Patent: Jun. 1, 1993

[54] TREAD COMPOUNDS CONTAINING MODIFIED EPDM WHICH EXHIBIT GOOD ABRASION RESISTANCE AND IMPROVED HYSTERESIS PROPERTIES

[75] Inventors: Paul H. Sandstrom, Tallmadge; Leland E. Beyersdorff, North Canton; Roger J. Hopper, Akron, all of Ohio

[73] Assignee: The Goodyear Tire & Rubber Company, Akron, Ohio

[21] Appl. No.: 877,576

[22] Filed: May 1, 1992

Related U.S. Application Data

[63] Continuation-in-part of Ser. No. 676,494, Mar. 28, 1991, abandoned.

[51] Int. Cl.$^5$ .......................... C08K 3/04; C08L 9/00; C08L 23/26; B60C 1/00

[52] U.S. Cl. .................................. 524/495; 525/211; 525/237; 525/194; 524/496; 152/209 R

[58] Field of Search .................... 525/237, 211; 152/209 R; 524/495

[56] References Cited

U.S. PATENT DOCUMENTS

| | | | |
|---|---|---|---|
| 3,915,907 | 10/1975 | Hopper | 525/351 |
| 4,814,384 | 3/1989 | Mitchell et al. | 525/211 |
| 4,820,780 | 4/1989 | Hopper | 525/351 |
| 4,849,478 | 7/1989 | Mori et al. | 525/211 |
| 4,910,266 | 3/1990 | Hopper | 525/357 |

*Primary Examiner*—Carman J. Seccuro, Jr.
*Attorney, Agent, or Firm*—H. C. Young, Jr.

[57] ABSTRACT

A tire tread composition comprises a tread rubber compound containing a sulfonamide modified EPDM terpolymer which imparts improved abrasion resistance, improved ozone resistance, improved hysteresis and the like.

11 Claims, No Drawings

TREAD COMPOUNDS CONTAINING MODIFIED EPDM WHICH EXHIBIT GOOD ABRASION RESISTANCE AND IMPROVED HYSTERESIS PROPERTIES

CROSS REFERENCE

This application is a continuation-in-part application of U.S. application Ser. No. 07/676,494, filed Mar. 28, 1991, having the title of "Tread Compounds Containing Modified EPDM Which Exhibit Good Abrasion Resistance and Improved Hysteresis Properties", now abandoned.

FIELD OF THE INVENTION

The present invention relates to utilizing N-chlorothio-sulfonamide modified EPDM in the tread portion of tires along with a high Tg polymer.

BACKGROUND

Unsaturated rubbery polymers, such as diene type rubbers tend to exhibit poor aging characteristics and poor ozone resistance. These diene rubbers are commonly used in the formation of tire treads. Low unsaturation rubbers such as EPDM may be blended with diene rubbers to improve ozone resistance, but such blends exhibit increased hysteresis and reduced tensile strength and reduced modulus due to poor cure compatibility.

U.S. Pat. No. 3,915,907 to Roger J. Hopper, relates to chlorothio-sulfonamide-modified rubbery terpolymers having a low degree of unsaturation, mixtures of such modified terpolymers with highly unsaturated rubbery polymers and vulcanizates of such mixtures. As a result of improved cure compatibility, the vulcanizates showed superior properties and/or are particularly useful in the structure of pneumatic tire sidewalls. The modified rubbery terpolymers are prepared by reacting a terpolymer of ethylene, an α-olefin containing from 3 to 6 carbon atoms, and a non-conjugated diene containing from 6 to 12 carbon atoms with a N-chlorothio-sulfonamide. In a preferred embodiment, where the alpha-olefin is propylene, such terpolymers are commonly known as EPDM rubbers. The incorporation of the chlorothiosulfonamides into low unsaturated rubbery terpolymers can be achieved in a variety of ways such as by direct mixing, incorporation by swelling, or by reaction in solution. The rate of the reaction can be greatly accelerated by conducting it in the presence of a saturated aliphatic carboxylic acid containing from 6 to 30 carbon atoms, such as stearic acid. U.S. Pat. Nos. 4,820,780 and 4,910,266 to Roger J. Hopper relate to the use of such carboxylic acids.

SUMMARY OF THE INVENTION

It is an object of this invention to provide tread compounds having reinforcing grade carbon blacks wherein the unsaturated diene rubbers are partially replaced by a modified EPDM rubber. Cured property results are dramatic in the modified blends of the present invention. An unexpected balance of properties such as lower hysteresis, improved abrasion resistance, and improved skid properties are obtained. The use of a high Tg polymer to further enhance properties is also disclosed. Improved antiozonant properties of the modified blends of the present invention also allow the removal of some or all of the amine antiozonant conventionally used, and therefore result in a non-staining tread.

DETAILED DESCRIPTION OF THE INVENTION

The tire tread composition of the present invention can contain one or more conventional tread rubbers which are generally well known to the art as well as to the literature. When such conventional tread rubbers have a Tg below $-50°$ C., they will be defined in this application as low Tg tread rubbers derived from conjugated dienes. Such tread rubbers can be made from conjugated dienes having from 4 to 12 carbon atoms with specific examples including butadiene, isoprene, pentadiene, hexadiene, heptadiene, octadiene, 2,3-dimethyl-1,3-butadiene, 2-methyl-1,3-pentadiene, and the like, with butadiene being preferred. In conventional tread rubbers, the weight percent of repeat units made from polymerizing one or more conjugated dienes is greater than 20, desirably greater than 40, and preferably greater than 60. Included within the above group of polymers is natural as well as synthetic rubber, that is cis-1,4-polyisoprene wherein the cis content is often above 75 percent, desirably above 85 or 90 percent, and often greater than 95 percent of the total number of microstructure units within the polymer.

Another group of conventional tread rubbers are various copolymers (i.e. interpolymers) made from conjugated dienes having from 4 to 12 carbon atoms with specific examples including polybutadiene-isoprene, and the like. These dienes copolymers can have various microstructures, such as a cis-1,4 configuration, a trans-1,4 configuration, or a 1,2-configuration. When the copolymers have a Tg below $-50°$ C., they will be defined in this application as low Tg polymers derived from conjugated dienes. The amount of low Tg polymers derived from conjugated dienes in the tread rubber blend is from 0 to about 80 parts, desirably from 0 to about 65 parts, and preferably from 0 to about 50 parts by weight based on 100 parts by weight of rubbers in said tread rubber blends.

High vinyl polybutadiene is a preferred tread rubber. This high vinyl polybutadiene has from about 55 percent to about 85 percent 1,2-configuration butadiene in the polymer chain, desirably from about 60 percent to about 80 percent 1,2-configuration and preferably about 65 percent to about 75 percent 1,2-configuration butadiene in the polymer chain. This polymer has a Tg as measured by DSC (differential scanning calorimetry) of $-50°$ C. and above or preferably about $-40°$ C. to about $-20°$ C. For the purpose of this application, conventional tread rubber polymers having a Tg above $-50°$ C. will be defined as high Tg polymers derived from conjugated dienes. Other high Tg polymers derived from conjugated dienes currently known are certain styrene-butadiene copolymers, 3,4-polyisoprene, some nitrile rubbers, and some isoprene-butadiene copolymers. The amount of high Tg polymers derived from conjugated dienes in the tread rubber blend is from about 10 to about 60 parts by weight and desirably from about 15 to about 55 parts by weight and preferably from 20 to about 50 parts by weight per one hundred parts by weight of rubber in the tread rubber blend.

Another group of conventional tread rubbers used are various copolymers made from monomers of conjugated dienes having from 4 to 12 carbon atoms such as those listed and discussed herein above, and vinyl substituted aromatic compounds containing 8 to 15 carbon atoms. Specific vinyl substituted aromatic compounds include styrene, alpha-methyl styrene, 4-t-butylstyrene, vinyl toluene, divinyl benzene, isopropenyl benzene, diisopropenyl benzene, and the like. A specific and preferred copolymer is random polystyrene-butadiene (SBR). Various block or graft copolymer can also be utilized such as polystyrene-butadiene-styrene, polybutadiene-g-styrene, and the like. These can be high or low Tg polymers derived from conjugated dienes.

Another useful conventional tread rubber is nitrile rubber, that is rubbers which are copolymers made from conjugated dienes having from 4 to 12 carbon atoms with acrylonitrile monomers or alkyl derivatives thereof wherein the alkyl derivative has from 1 to 4 carbon atoms such as methacrylonitrile, and the like. This can be a high or low Tg polymer derived from conjugated dienes depending on its compositions.

According to the present invention, new tread rubber is sulfonamide modified EPDM terpolymers which are blended with the previously described conventional tread rubbers. For the purpose of this application, modified EPDM is not a high or a low Tg polymer derived from conjugated dienes. These blends of modified EPDM and other tread rubbers have been found to yield unexpected improvements with regard to tread rubber properties. The tread rubbers are divided into modified EPDM, high Tg polymers derived from conjugated dienes, and low Tg polymers derived from conjugated dienes. The amount of the modified EPDM rubbers is generally from about 10 to about 80 parts by weight, desirably from about 20 to about 70 parts by weight, and preferably from about 20 to about 50 percent by weight for every 100 parts by weight of the one or more tread rubbers. The modified EPDM rubbers of the present invention can be made in accordance with U.S. Pat. Nos. 3,915,907, 4,820,780, and 4,910,266, all of which are incorporated herein by reference in their entirety, which disclose techniques for modifying rubbery terpolymers with N-chlorothio-sulfonamides. Preferably, the present invention relates to such terpolymers wherein such a modification is conducted in the presence of a saturated aliphatic carboxylic acid containing from 6 to 30 carbon atoms.

The N-chlorothio-sulfonamides utilized to modify terpolymers have the structural formula:

$$R^1SO_2N(R^2)-SCl$$

where $R^1$ and $R^2$, independently, are selected from the group consisting of alkyl radicals having 1 to 20 carbon atoms, aralkyl radicals having 7 to 20 carbon atoms, alkaryl radicals having from 7 to 20 carbon atoms, and haloaryl radicals having 6 to 10, carbon atoms and where $R^1$ is also selected radicals having the formula:

where $R^3$ and $R^4$ are, independently, selected from said alkyl, aralkyl, and haloaryl radicals having from 1 to 20 carbon atoms and where $R^3$ and $R^4$ can be joined together to represent radicals selected from

where n is an integer of 4 to 7, and

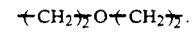

In these N-chlorothio-sulfonamides, $R^1$ and $R^2$ are preferably selected from alkyl radicals having 1 to 6 carbon atoms, phenyl radicals, monoalkyl substituted phenyl radicals having from 7 to 10 carbon atoms and dialkyl substituted phenyl radicals having from 8 to 11 carbon atoms. Representative of the radicals suitable for $R^1$ are radicals selected from methyl, tert-butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals. Most preferably $R^1$ and $R^2$ are methyl groups, ethyl groups, propyl groups, butyl groups, phenyl groups, para-tolyl groups, and p-chlorophenyl groups.

Representative examples of N-chlorothiosulfonamides which can be used in the present invention include N-chlorothio-N-methyl-methanesulfonamide, N-chlorothio-N-methylbenzenesulfonamide, N-chlorothio-N-methyl-p-toluenesulfonamide, N-chlorothio-N-ethyl-p-toluenesulfonamide, N-chlorothio-N-methyl-ethanesulfonamide, N-chlorothio-N-phenyl-p-toluenesulfonamide, N-chlorothio-N-(2-propyl)-methanesulfonamide, N-chlorothio-N-(1-propyl)-methanesulfonamide, N-chlorothio-N-(1-propyl)-p-chlorobenzenesulfonamide, N-chlorothio-N-phenyl-methanesulfonamide, N-chlorothio-N,N',N'-trimethylsulfamide, N-chlorothio-N-methyl-N',N'-(pentamethylene) sulfamide, N-chlorothio-N-methyl-N',N-diethylsulfamide and N-chlorothio-N-phenyl-benzenesulfonamide. N-chlorothio-N-methylbenzenesulfonamide is preferred, as well as N-chlorothio-N-methyl-methanesulfonamide and N-chlorothio-N-methyl-p-toluenesulfonamide Chlorothio-sulfonamides suitable for use in the present invention, as well as their preparation, have further been described in the patent literature. For example, West German DPS No. 1,156,403, discloses the preparation of chlorothio-sulfonamides by reaction of a sulfonamide with $SCl_2$ in the presence of an organic acid acceptor, and West German DPS No., 1,101,407 discloses the preparation of chlorothio-sulfonamides from N,N'-dithiobis(sulfonamides) and chlorine or sulfuryl chloride, both of which are hereby incorporated by reference in their entirety, The chlorothio-sulfonamides of the present invention can be prepared by analogous procedures.

The rubbery terpolymer is an ethylene-propylene diene terpolymer (EPDM). The unmodified EPDM of this invention includes terpolymers, tetrapolymers, and the like. Thus, the EPDM will comprise ethylene, one or more alpha-olefins, and one or more diene monomers, and can be substantially amorphous, and can have a substantially random arrangement of at least the ethylene and the alpha-olefin monomers. The EPDM, prior to modification with sulfonamides, will generally have a weight average molecular weight in the range of between about 10,000 and 1 million or higher, typically between about 15,000 and 500,000, and more typically between about 20,000 and 350,000.

EPDM generally has a degree of crystallinity less than about 25 percent, preferably less than about 15 percent, and more preferably less than about 10 percent as measured by means known to the those skilled in the art. This degree of crystallinity is known by those skilled in the art to be "substantially amorphous."

EPDM useful in this invention will contain about 20 to about 90 weight percent ethylene, preferably about 30 to about 85 weight percent ethylene, and more preferably about 35 to about 70 weight percent ethylene.

Alpha-olefin, suitable for use in the preparation of the EPDM, preferably have from about 3 to about 16 carbon atoms. Examples of such alpha-olefins include propylene, 1-butene, 1-pentene, 1-hexene, 1-octene, and 1-dodecene. The alpha-olefin content of the EPDM prior to modification is generally about 10 to about 80 weight percent, and preferably from about 20 to about 70 weight percent. The preferred alpha-olefin is propylene.

The diene in the EPDM is present from about 0.1 to about 0.8 mole of diene per kilogram of the EPDM polymer. The preferred dienes are non-conjugated dienes having 6 to 12 carbon atoms such as 1,4 hexadiene, dicyclopentadiene, 5 ethylidene-2-norbornene, 5-methylene-2-norbornene, 4, 7, 8, 9-tetrahydroindene, and 1,5-cyclooctadiene. Thus, the preferred EPDM for this invention is not derived from a conjugated diene.

The amount of N-chlorothio-sulfonamide needed to modify a given terpolymer depends upon a number of factors including the specific nature of the terpolymer being modified and the characteristics desired for the final vulcanizate. As a general rule from about 0.1 to about 10 phr (parts per hundred parts of rubber terpolymer) of the N-chlorothio-sulfonamide will be utilized. In most cases it will be preferred to utilized from about 0.5 to 5 phr of the N-chlorothio-sulfonamide modifier. As a general rule, the molar ratio of modifier to unsaturated sites in the polymer will be within the range of about 0.03/1 to about 1/1, but is preferably in the range of about 0.15/1 to about 0.8/1 and more preferably about 0.2/1 to about 0.7/1. With some EPDM polymers, the use of high ratios can lead to polymer viscosity increases which make processing exceedingly difficult or even practically unmanageable. It is expected that, recognizing this, those having ordinary skill in the polymer compounding art will use a ratio which enhances characteristics of the final vulcanized blend without detrimentally increasing polymer viscosity beyond the point of ease of processability.

The amount of the saturated aliphatic carboxylic acid utilized in the modification procedures of the present invention will generally be within the range of about 0.1 to 10 phr (terpolymer). It will normally be preferred for the amount of saturated aliphatic carboxylic acid utilized to be within the range of 1 to 6 phr with 3 to 4 phr being most preferred. The saturated aliphatic carboxylic acids which are utilized in the modification procedures of this invention contain from 6 to 30 carbon atoms and preferably from 10 to 28 carbon atoms. The most preferred saturated aliphatic carboxylic acids will contain from 12 to 20 carbon atoms. The saturated aliphatic carboxylic acids utilized will be saturated and will accordingly be of the formula $C_nH_{2n+1}COOH$, wherein n is an integer from 5 to 29. Palmitic acid, lauric acid, and stearic acid are representative examples of saturated aliphatic carboxylic acids of this type. Branched saturated aliphatic carboxylic acids containing from 6 to 30 carbon atoms, such as 2-ethylhexanoic acid, can also be utilized to accelerate the modification reaction.

The modifications of the EPDM terpolymer will preferably be carried out in an internal mixer, such as a Banbury mixer or an extruder. Such modifications are carried out by simply mixing the saturated aliphatic carboxylic acid and the N-chlorothio-sulfonamide modifier throughout the rubbery terpolymer being modified. Such modifications are normally conducted at an elevated temperature which is within the range of 60° C. to about 190° C. It is generally preferable for such modification procedures to be carried out at a temperature which is within the range of 100° C. to 170° C. with temperatures within the range of 110° C. to 160° C. being most preferred.

The saturated aliphatic carboxylic acids utilized in accordance with this invention accelerate the modification process by promoting the addition of chlorosulfamides to the EPDM, to the degree necessary for such modifications to be carried out in extruders having typical residence times. For instance, the modification reaction can be carried out at a rate that makes practical the utilization of extruders having residence times of 90 seconds or even less.

Unreacted modifier can react with water to produce hydrochloric acid as a reaction by-product. Hydrochloric acid typically has an adverse effect on extruders and other processing equipment. It also typically has an adverse effect on the properties of the rubber being prepared. For these reasons, it is usually advantageous to carry out the modification procedures of this invention in the presence of an agent which will react with the hydrochloric acid produced to form a salt. For instance, calcium carbonate can be added which will react with hydrochloric acid produced so as to form calcium chloride. It is normally desirable to utilize from 0.001 to 1 phr of calcium carbonate in the modification procedures of this invention. It will generally be preferred to utilize from 0.01 to 0.5 phr of calcium carbonate in such modification procedures with the utilization of 0.02 to 0.1 phr of calcium carbonate being most preferred.

The sulfonamide modified EPDM terpolymers of the present invention are blended with the one or more tread rubber compounds in any conventional manner such as in a Banbury, extruder, and the like. The mixing temperature ranges from about 150° F. to 300° F., and is preferably from about 200° F. to 250° F.

Various conventional rubber compounding additives can be utilized as known to those skilled in the art as well as to the literature. Such additives can include conventional amounts of activators, retarders, vulcanizing and curing agents; protective materials including antioxidants, antiozonants, antiblocking agents, antiflex cracking agents, flame retarders, fungicides, germicides, antistatic agents and chemical and heat stabilizers; processing materials including plasticizers and softeners, processing aids and tackifiers; extenders, fillers and reinforcing materials, and the like. Standard compounding ingredients include zinc oxide, carbon black, sulfur, oil and fatty acids.

Typical activators include various guanidines, thioureas, thiazoles, xanthates and their derivatives. These can be present from about 0.1 to about 0.5 parts per hundred parts of rubber in compounds. Peroxides are not part of the activators, vulcanizing or crosslinking agents of this embodiment since the same are generally detrimental to the diene rubbers. The vulcanizing and curing agents do include sulfur and/or a sulfur donor compound. The sulfur donor compound can be compounds such as amine disulfides, polymeric polysulfides, 2-(4-morpholinyl(dithio) benzothiazole, tetramethylthiuram disulfide, dipenta-methylene thiuram hexasulfide, N,N'-caprolactam disulfide, and the like.

The vulcanization or crosslinking process converts a weak thermoplastic mass into a useful strong elastic rubber. The properties of tensile strength, tear resistance, modulus, and rebound are all initially increased by the crosslinking process. The extent or level of crosslinking often reaches an optional value for tear strength and tensile strength before the maximum values for rebound, hardness, and modulus are reached. Thus, the choice of the level of crosslinking or vulcanization is often a compromise level to optimize a variety of properties of the final cured tread rubber composition rather than individually optimizing each property.

Similarly, the choice of tread rubbers may involve small unfavorable changes in one property for more significant increases in an essential property for the cured tread compound.

The fillers and reinforcing materials include various carbon blacks. The preferred carbon blacks for this embodiment are reinforcing (tread) grade carbon blacks, also known as high structure carbon blacks. These carbon blacks typically have Iodine Numbers by ASTM method of greater than 50 mg/g. The preferred range for Iodine Numbers is from about 90 to about 150 mg/g. A highly preferred range is from about 100 to about 150 mg/g. The ASTM Iodine Number is a measure of the surface area of carbon blacks and agrees well with BET (Nitrogen Adsorption) measurements on furnace blacks. The desired carbon blacks also have calculated particle diameters of from about 19 to about 28, and preferably from about 21 to about 25 nanometers. These types of carbon blacks produce composites with high modulus, low extensibility, and high abrasion resistance when compared to other larger diameter carbon blacks. The amount of carbon black used in this embodiment for a tread compound is from about 40 to about 120 parts, desirably from about 45 to about 90 parts, and preferably from about 50 to about 60 parts per one hundred parts by weight of tread rubbers. The type and amount of carbon black in a tread rubber composition can affect both the rate of curing or crosslinking and the final extent of curing or crosslinking.

Tires generally have a pneumatic tire casing of toroidal shape with an outer tread portion being connected to spaced beads by a sidewall. The cured sidewall inherently requires various properties in order to perform adequately. Such characteristics include low heat buildup, a low modulus, good flexibility, low structure carbon black, low Tg polymers, and the like. A low structure carbon black for tire sidewalls has an Iodine Number from about 20 to about 80 mg/g by ASTM standard methods and gives the sidewall compound good flexibility and low heat buildup. The components used in cured sidewalls are chosen and cured or crosslinked to achieve elongations by ASTM method D1054 of 600 percent or more and 300 percent modulus values of 3-6 MPa. Typically, sidewalls are protected with antioxidants and antiozonants and other environmental protectorants to minimize the effects of ozone and aging on the polymer. The amount of carbon black in a sidewall composition can vary from about 40 to about 60 parts per 100 parts rubber in the sidewall compound.

In distinct contrast thereto, the cured tread portion of the tire is radically different in that it inherently requires a higher modulus, less flexibility than a sidewall, high structure carbon black, good abrasion resistance, and generally is less concerned with heat build-up. In addition, high Tg polymers are included in tread compounds to give good traction whereas high Tg polymers would be detrimental in tire sidewalls whereby they would be detrimental to flexibility and cause heat buildup. High structure carbon blacks are used in the tread compound to give higher modulus and better abrasion resistance than achieved with low structure carbon blacks. The heat buildup caused by high structure blacks in tread compounds is less of a concern as the tread suffers less deformation than the sidewalls. Thus, tread compositions are formulated and cured to have elongations by ASTM D1054 method of 550 percent or less and 300 percent modulus of about 10 to about 16 MPa, and desirably about 12 to about 15 MPA. Moreover, tire treads require good wearability, good abrasion resistance, good resistance to aging and ozone and a low hysteresis for reduced rolling resistance. It was therefore unexpected that the use of the above-described sulfonamide modified EPDM, when utilized in the tread portion of the tire, retained or improved aging and ozone resistance, improved skid resistance, lowered hysteresis, as well as improved abrasion resistance. Typically, tires require amine-based antioxidants in the tread portion of the tire. The anti-oxidants have a tendency to migrate into the sidewall and stain the sidewall. It has been found that with the use of the above-noted modified EPDM the amount of amine antiozonant which is generally required is reduced or eliminated and thus generally produces a non-staining tire tread.

Often tire treads are composed of blends of synthetic rubbers or blends of synthetic rubber with natural rubber for the purpose of achieving desirable tread characteristics such as wear resistance, good traction, reduction in rolling resistance, etc. Different types of rubbers can contribute to one or more of these properties. For example, natural rubber with its low Tg gives low rolling resistance and good wear resistance, but because of its resilience, does not give good traction. Other rubbers that give good traction having higher Tg values tend not to have low rolling resistance.

These properties of traction, resilience, wear or abrasion resistance and low hysteresis or rolling resistance are also affected by the amount of crosslinking or curing within the network. The amount of crosslinking is controlled by the vulcanizing agent, accelerators, and the time interval and temperature of the curing cycle. Thus, to achieve optimal resilience, abrasion resistance, low hysteresis, one needs to optimize the amount of crosslinking by varying the types and amounts of accelerators and vulcanizing agents.

In this embodiment, the traction characteristics are measured by the Wet Concrete Skid laboratory test. Higher values represent improvement or more resistance to skidding. The Pico Abrasion Index measures the resistance to abrasion. A higher value means improvement or more resistance to abrasion The Hot Rebound test measures the resilience which is inversely related to hysteresis. In order to get a tire tread with good rolling resistance, one would maximize resilience and minimize hysteresis at the operating temperature of the tire tread during normal operation. To optimize wet concrete skid, one typically requires higher hysteresis in the tread compound in the temperature range from about −50° to about 20° C. In contrast in a sidewall compound, one would want to minimize hysteresis from −50° C. to 100° C.

A further advantage of the current invention is the production of a continuous construction between the sidewall and tread portion of the tire. This eliminates a potential weak point that generally results in cracking at the interface of the tread and sidewall when modified EPDM is not present in both portions.

The invention is illustrated by the examples which are merely for the purpose of illustration and are not to be regarded as limiting.

EXAMPLE 1

Preparation of Modified EPDM

Modified Nordel 2744 was prepared in a BR Banbury internal mixer (Farrel Corp.) according to the following procedure. The EPDM utilized in this experiment was a RTM, DuPont Nordel 2744 ® with a Tg of about −51.2° C. With the rotors at 40 rpm, 497.5 g of Nordel 2744, 35 g of stearic acid, 0.20 g of calcium carbonate and another 497.5 g of Nordel 2744 were added sequentially. The ram was lowered and to rotor speed increased to raise the batch temperature to 135° C., whereupon 33 g of N-chlorothio-N-methyl-p-toluenesulfonamide was added. Mixing was continued for 6 minutes while controlling the temperature at 135° C. by adjusting the rotor speed. The batch was then discharged and sheeted out on a two-roll mill at ambient temperature.

EXAMPLE 2

Rubber compositions containing the materials set out in Table I were prepared in a BR Banbury mixer using two separate stages of addition. Table II sets out the cure behavior and vulcanizate properties of several polymer blends which contain cis-1,4-polybutadiene (BUD 1207 ®) and Nordel 2744 ® EPDM and also cis-1,4-polybutadiene blended with the modified EPDM described in Example 1. The replacement of the unmodified Nordel 2744 ® EPDM (Test Samples A and C) with the modified EPDM (Test Samples B and D) in blends with 30 or 50 phr cis-1,4-polybutadiene provides higher modulus, higher rebound and improved Pico abrasion resistance. These properties are critical for application of an EPDM polymer in a tire tread compound. Improvements in ozone resistance and aged or weathering properties are also expected as a result of the modified EPDM being present in the blend composition.

EXAMPLE 3

Rubber compositions containing the materials set out in Table I were prepared in a BR Banbury using two separate stages of addition. Table III sets out the cure behavior and vulcanizate properties of polymer blends which contain natural rubber blended with Nordel 2744 ® EPDM or with modified EPDM and solution SBR blended with Nordel 2744 ® EPDM or with modified EPDM. The replacement of the unmodified Nordel 2744 ® EPDM (Test Samples E and G) with the modified EPDM (Test Samples F and H) in blends with 50 phr natural rubber or 50 phr solution SBR provides higher modulus, higher rebound and improved Pico abrasion resistance. These properties are critical for application of an EPDM polymer in a tire tread compound. Improvements in ozone resistance and aged or weathering properties are also expected as a result of the modified EPDM being present in the blend composition.

EXAMPLE 4

Rubber compositions containing the materials set out in Table I were prepared in a BR Banbury using two separate stages of addition. Table IV sets out the cure behavior and vulcanizate properties of polymer blends which contain high vinyl PBD blended with Nordel 2744 ® EPDM or with modified EPDM and natural rubber and Shell 901 ® blended with Nordel 2744 ® EPDM or modified EPDM. The replacement of the unmodified Nordel 2744 ® EPDM (Test Samples I and K) with the modified EPDM (Test Samples J and L) in blends with 50 phr high vinyl PBD or 60 phr of natural rubber and 20 phr Shell 901 ® provides higher modulus, higher rebound and improved Pico abrasion resistance. These properties are critical for application of an EPDM polymer in a tire tread compound. Improvements in ozone resistance and aged or weathering resistance are also expected as a result of the modified EPDM being present in the blend composition.

SUMMARY OF EXAMPLES 2–5

A summary of the key physical properties for the modified EPDM containing compounds is shown in Table V. All of the compounds exhibit reasonable cured properties for consideration as tread compounds. The best properties when considered for tread performance (treadwear, skid resistance, rolling resistance and handling) are shown by Sample J. The combination of high vinyl PBD and modified EPDM are predicted from lab data to provide the best performance as a tread compound.

TABLE I

| Material | Weight Parts | Banbury Stage |
|---|---|---|
| Polymer | 100.0 | 1 |
| Carbon Black* | 45.0 | 1 |
| Processing Oil** | 9.0 | 1 |
| Wax | 1.0 | 1 |
| Antidegradants | 3.0 | 1 |
| Zinc Oxide | 3.0 | 2 |
| Accelerators | 1.12 | 2 |
| Sulfur | 1.6 | 2 |

*ISAF (ASTM N-220)
**Naphthenic/paraffinic oil

TABLE II

| Cure Behavior and Vulcanizate Proerties | | | | |
|---|---|---|---|---|
| | A | B | C | D |
| | (Control) | | (Control) | |
| BUD 1207 ® | 30.0 | 30.0 | 50.0 | 50.0 |
| Nordel 2744 ® | 70.0 | 0 | 50.0 | 0 |
| Modified EPDM | 0 | 70.0 | 0 | 50.0 |
| Rheometer, 150° C. | | | | |
| Max Torque | 22.8 | 42.0 | 26.4 | 38.0 |
| Min Torque | 8.5 | 10.7 | 8.4 | 9.9 |
| Delta Torque | 14.3 | 31.3 | 18.0 | 29.0 |
| t90, minutes | 27.4 | 35.2 | 37.5 | 40.0 |
| Stress Strain | | | | |
| Tensile Strength, MPa | 9.8 | 23.7 | 10.1 | 13.4 |
| Elongation at Break % | 430 | 280 | 345 | 315 |
| 300% Modulus, MPa | 7.7 | — | 7.9 | 12.6 |
| Pendulum Skid | | | | |
| Dry Asphalt | 80 | 81 | 79 | 79 |
| Wet Asphalt | 46 | 40 | 53 | 54 |
| Dry Concrete | 90 | 84 | 92 | 87 |
| Wet Concrete | 66 | 44 | 62 | 59 |
| Pico Abrasion | | | | |

TABLE II-continued

Cure Behavior and Vulcanizate Proerties

|  | A | B | C | D |
|---|---|---|---|---|
| Index Value | 56% | 154% | 70% | 122% |
| Rebound |  |  |  |  |
| Cold, % (RT) | 61.5 | 63.6 | 57.0 | 59.0 |
| Hot, % (100° C.) | 52.0 | 71.8 | 59.0 | 71.8 |
| Vibrotest, 100° C. |  |  |  |  |
| Dynamic Modulus, MPa | 7.63 | 9.01 | 7.88 | 8.49 |
| Dynamic Resilience, % | 48.2 | 42.8 | 28.1 | 41.5 |

TABLE III

Cure Behavior

|  | E | F | G | H |
|---|---|---|---|---|
|  | (Control) |  | (Control) |  |
| Natural Rubber | 50.0 | 50.0 | 0 | 0 |
| Solution SBR* | 0 | 0 | 50.0 | 50.0 |
| Nordel 2744 ® | 50.0 | 0 | 50.0 | 0 |
| Modified EPDM | 0 | 50.0 | 0 | 50.0 |
| Rheometer, 150° C. |  |  |  |  |
| Max Torque | 25.0 | 38.5 | 26.5 | 39.3 |
| Min Torque | 6.4 | 8.0 | 9.5 | 10.7 |
| Delta Torque | 18.6 | 30.5 | 17.0 | 28.6 |
| t90, minutes | 15.5 | 18.5 | 38.7 | 42.7 |
| Stress Strain |  |  |  |  |
| Tensile Strength, MPa | 13.0 | 20.0 | 10.5 | 14.4 |
| Elongation at Break % | 475 | 410 | 325 | 300 |
| 300% Modulus, MPa | 9.0 | 13.0 | 9.6 | 14.4 |
| Pendulum Skid |  |  |  |  |
| Dry Asphalt | 79 | 80 | 79 | 83 |
| Wet Asphalt | 46 | 45 | 51 | 51 |
| Dry Concrete | 90 | 92 | 90 | 90 |
| Wet Concrete | 54 | 53 | 53 | 56 |
| Pico Abrasion |  |  |  |  |
| Index Value | 73 | 135 | 75 | 127 |
| Rebound |  |  |  |  |
| Cold, % (RT) | 61.0 | 62.0 | 58.5 | 61.0 |
| Hot, % (100° C.) | 56.0 | 73.6 | 59.0 | 73.0 |
| Vibrotest, 100° C. |  |  |  |  |
| Dynamic Modulus, MPa | 6.98 | 8.11 | — | 7.3 |
| Dynamic Resilience, % | 41.1 | 43.2 | — | 28.1 |

*Contains 10% bound styrene

TABLE IV

Cure Behavior and Vulcanizate Properties

|  | I | J | K | L |
|---|---|---|---|---|
|  | (Control) |  | (Control) |  |
| High Vinyl PBD* | 50 | 50 | 0 | 0 |
| Natural Rubber | 0 | 0 | 60 | 60 |
| Shell 901 ® | 0 | 0 | 20 | 20 |
| Nordel 2744 ® | 50 | 0 | 20 | 0 |
| Modified EPDM | 0 | 50 | 0 | 20 |
| Rheometer, 150° C. |  |  |  |  |
| Max Torque | 27.0 | 39.0 | 28.1 | 33.0 |
| Min Torque | 8.1 | 9.5 | 5.7 | 5.9 |
| Delta Torque | 18.9 | 29.5 | 22.4 | 27.1 |
| t90, minutes | 49.0 | 48.5 | 13.1 | 15.9 |
| Stress Strain |  |  |  |  |
| Tensile Strength, MPa | 10.6 | 14.5 | 17.8 | 20.4 |
| Elongation at Break % | 310 | 290 | 520 | 470 |
| 300% Modulus, MPa | 10.0 | — | 9.5 | 11.4 |
| Pendulum Skid |  |  |  |  |
| Dry Asphalt | 79 | 80 | 85 | 85 |
| Wet Asphalt | 51 | 50 | 53 | 52 |
| Dry Concrete | 90 | 84 | 94 | 94 |
| Wet Concrete | 54 | 59 | 59 | 59 |
| Pico Abrasion | 159 | 109 |  |  |
| Index Value | 72 | 140 | 74 | 109 |
| Rebound |  |  |  |  |
| Cold, % (RT) | 57.0 | 59.0 | 64.7 | 63.1 |
| Hot, % (100° C.) | 60.0 | 73.0 | 69.0 | 74.6 |
| Vibrotest |  |  |  |  |
| Dynamic Modulus, MPa | 8.1 | 8.9 | 5.9 | 6.3 |

TABLE IV-continued

Cure Behavior and Vulcanizate Properties

|  | I | J | K | L |
|---|---|---|---|---|
| Dynamic Resilience, % | 30.2 | 47.2 | 38.9 | 43.1 |

*Nippon Zeon BR 1245 ®

TABLE V

Comparison of Key Physical Properties

|  | B | D | F | H | J | L |
|---|---|---|---|---|---|---|
| Natural Rubber | 0 | 0 | 50 | 0 | 0 | 60 |
| Solution SBR | 0 | 0 | 0 | 50 | 0 | 0 |
| High Vinyl PBD* | 0 | 0 | 0 | 0 | 50 | 0 |
| Shell 901 | 0 | 0 | 0 | 0 | 0 | 20 |
| Modified EPDM | 70 | 50 | 50 | 50 | 50 | 20 |
| BUD 1207 ® | 30 | 50 | 0 | 0 | 0 | 0 |
| 300% Modulus, MPa | — | 12.6 | 13.0 | 14.4 | — | 11.4 |
| Wet Concrete Skid** | 44 | 59 | 53 | 56 | 59 | 59 |
| Pico Abrasion | 154 | 122 | 135 | 127 | 140 | 109 |
| Index** |  |  |  |  |  |  |
| Hot Rebound, % | 71.8 | 71.8 | 73.0 | 73.0 | 73.0 | 74.6 |
| Dynamic Modulus, MPa | 9.01 | 8.49 | 8.11 | 7.3 | 8.9 | 6.3 |

*Nippon Zeon BR 1245 ® (70-75% vinyl structure)
**Higher values represent improvements in wet skid and abrasion resistance.

While in accordance with the Patent Statutes, the best mode and preferred embodiment has been set forth, the scope of the invention is not limited thereto, but rather by the scope of the attached claims.

What is claimed is:

1. A tire tread made from a rubber composition comprising; based on 100 parts by weight of tread rubbers,
   a. up to about 80 parts by weight of one or more tread rubbers derived from conjugated dienes having a Tg below −50° C.,
   b. about 10 to about 60 parts by weight of high vinyl polybutadiene tread rubber having from about 55 to about 85 percent 1,2-configuration butadiene having a Tg about −50° C.,
   c. about 10 to about 80 parts by weight of N-chlorothio-sulfonamide modified ethylene-polypylene-diene terpolymer (EPDM), and
   d. about 40 to about 120 parts by weight of carbon black having an Iodine Number above about 90 mg/g.

2. The tire tread as in claim 1, wherein the weight percent ethylene in said EPDM is about 30 to about 70, and said EPDM contains about 0.1 to about 0.8 moles of nonconjugated diene termonomer per kilogram of polymer.

3. The tire tread of claim 2, wherein a saturated aliphatic carboxylic acid is utilized during modification within a range of about 0.1 to 10 parts per hundred parts by weight EPDM.

4. The tire tread of claim 3, wherein the Iodine Number of the carbon black is from about 90 to about 150 mg/g and wherein the N-chlorothiosulfonamide modified EPDM is present form about 20 to about 70 parts by weight per 100 parts by weight tread rubbers.

5. The tire tread of claim 4, wherein said polybutadiene has a Tg of about −40° C. to about −20° C., and wherein about 0.5 to about 5 parts of N-chlorothio-sulfonamide per hundred parts of EPDM is used to modify the terpolymer.

6. The tire tread of claim 5, wherein said saturated aliphatic carboxylic acid is utilized during modification within the range from about 0.1 parts to about 10 parts by weight aliphatic acid per 100 parts by weight of EPDM.

7. The tire tread of claim 6 having a 300 percent modulus of about 10 to about 16 MPa by ASTM D 1054 after curing.

8. The tire tread of claim 6, having an elongation by ASTM D1054 of 550 percent or less after curing.

9. The tire tread of claim 6, wherein said N-chlorothio-sulfonamide modifier is N-chlorothio-N-methylbenzene-sulfonamide, N-chlorothio-N-methyl-methanesulfonamide, or N-chlorothio-N-methyl-p-toluenesulfonamide.

10. The tire tread of claim 6, wherein about 1 to about 6 parts of aliphatic carboxylic acid is used per hundred parts by weight of EPDM.

11. The tire tread of claim 4, wherein said polybutadiene has about 65 to about 75 percent 1,2-vinyl enchainment; wherein said carbon black has an iodine number by ASTM methods of about 100 to about 150 mg/g; and wherein said tread rubbers derived from conjugated dienes having a Tg below $-50°$ C. are not present in the tread compound.

* * * * *

UNITED STATES PATENT AND TRADEMARK OFFICE
CERTIFICATE OF CORRECTION

PATENT NO. : 5,216,066
DATED : June 1, 1993
INVENTOR(S) : P. Sandstrom et al.

It is certified that error appears in the above-identified patent and that said Letters Patent is hereby corrected as shown below:

Column 12, line 39, delete the word "about" and insert therefor the word --above--.

Signed and Sealed this

Fourteenth Day of June, 1994

Attest:

BRUCE LEHMAN

Attesting Officer    Commissioner of Patents and Trademarks